United States Patent [19]

Hall, Jr.

[11] 4,334,296
[45] Jun. 8, 1982

[54] SEISMIC METHOD AND APPARATUS

[75] Inventor: Ernest M. Hall, Jr., Houston, Tex.

[73] Assignee: Western Geophysical Co. of America, Houston, Tex.

[21] Appl. No.: 81,729

[22] Filed: Oct. 1, 1979

Related U.S. Application Data

[63] Continuation of Ser. No. 887,165, Mar. 16, 1978, abandoned, which is a continuation-in-part of Ser. No. 783,531, Apr. 1, 1977, abandoned.

[51] Int. Cl.$^3$ .................................. G01V 1/18
[52] U.S. Cl. .................................. 367/180; 367/166; 367/171; 367/177; 73/644
[58] Field of Search ............ 367/177, 180, 181, 155, 367/166, 171; 73/634, 644, 652; 310/329, 331

[56] References Cited

U.S. PATENT DOCUMENTS

| | | |
|---|---|---|
| 2,615,940 | 10/1952 | Williams . |
| 2,649,579 | 8/1953 | Alexander . |
| 2,650,991 | 9/1953 | Ketchledge . |
| 3,187,300 | 6/1965 | Brate . |
| 3,461,730 | 8/1969 | Peters . |
| 3,739,202 | 6/1973 | Cady ............................ 367/180 |
| 3,810,083 | 5/1974 | Kostelnicek . |
| 3,813,744 | 6/1974 | Morris . |
| 3,911,388 | 10/1975 | Crump et al. . |
| 3,987,320 | 10/1976 | Merhar . |
| 4,104,921 | 8/1978 | Nisser . |

FOREIGN PATENT DOCUMENTS

| | | |
|---|---|---|
| 847866 | 9/1960 | United Kingdom . |
| 614403 | 7/1978 | U.S.S.R. ............................ 367/180 |
| 642657 | 1/1979 | U.S.S.R. ............................ 367/180 |

*Primary Examiner*—Nelson Moskowitz
*Attorney, Agent, or Firm*—William A. Knox; Norman E. Brunell

[57] ABSTRACT

The seismic method comprises in one preferred embodiment, towing a long, flexible member over the earth's surface, the member having liquid-filled geophones mounted thereon or coupled thereto and suitably spaced therealong, and a seismic cable for receiving the individual outputs of the geophones. Each liquid-filled geophone provides an output electric signal having a polarity corresponding to the direction of the earth's motion. In another embodiment of the method of this invention, the geophones are positioned on the earth's surface in a predetermined pattern; their output signals are transmitted to a utilization device; then the geophones are moved to another location, and the detection process is repeated.

In a simplified embodiment, the geophone comprises a hollow cylindrical casing defining a chamber therein. A high-density liquid substantially fills the chamber. The chamber has a flexible bottom wall which constitutes a force or pressure transducer. In a preferred embodiment of the geophone, the chamber has in addition to the flexible bottom wall, a flexible top wall which also constitutes a transducer. The geophone provides at its output terminals an electric signal which suitably combines the output signals of the pair of transducers.

29 Claims, 9 Drawing Figures

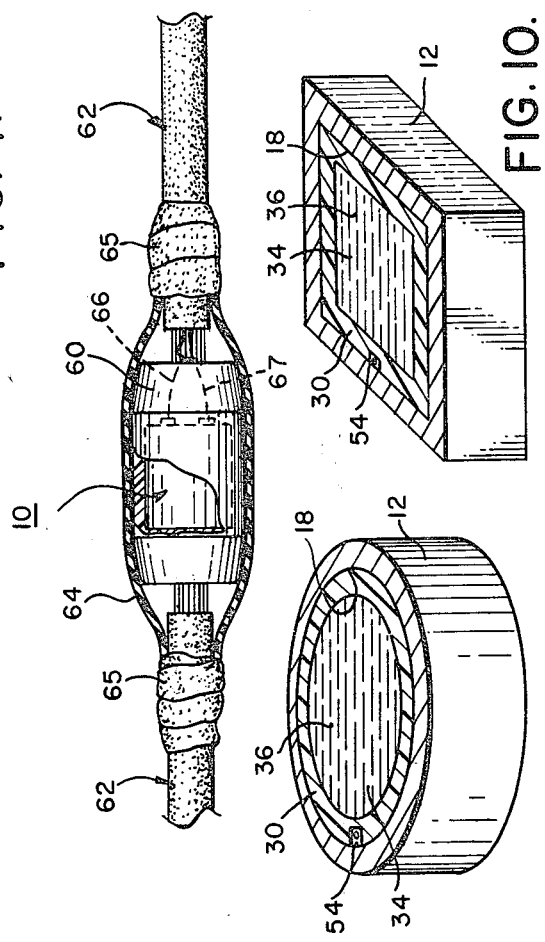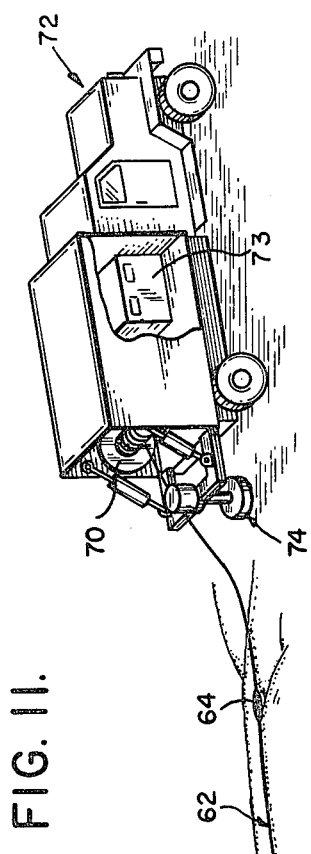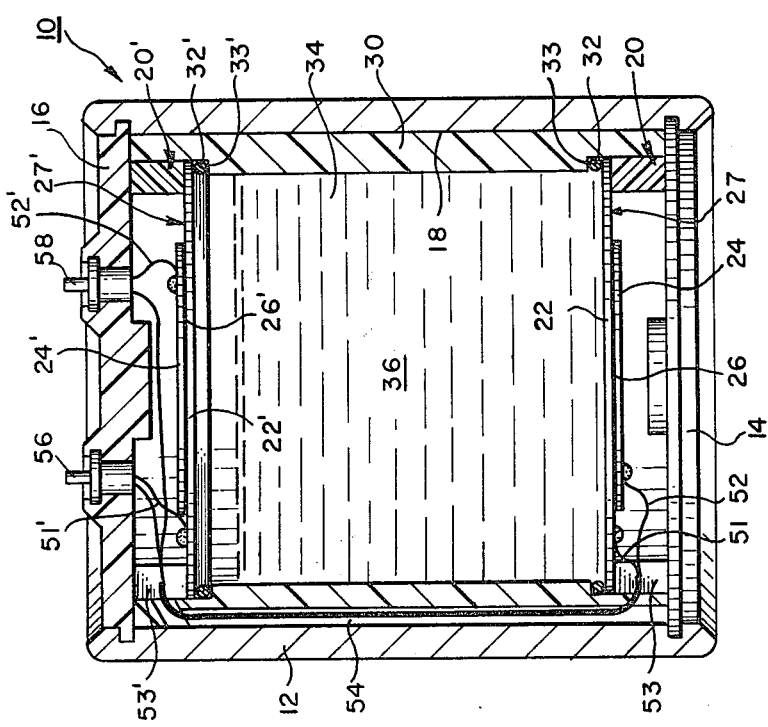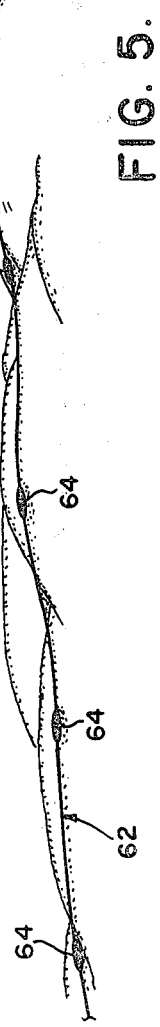

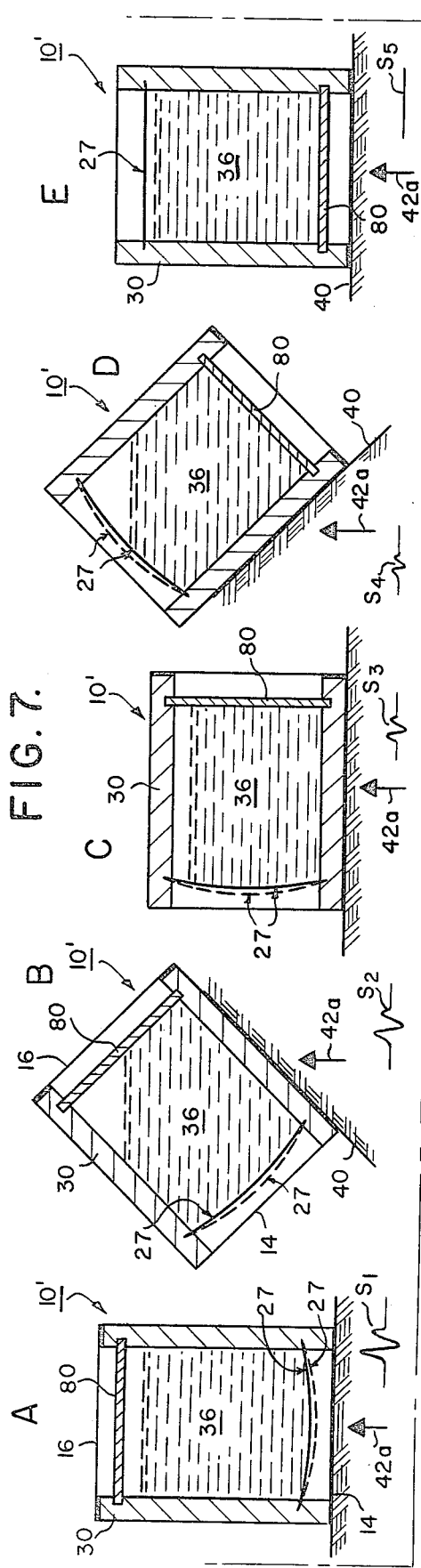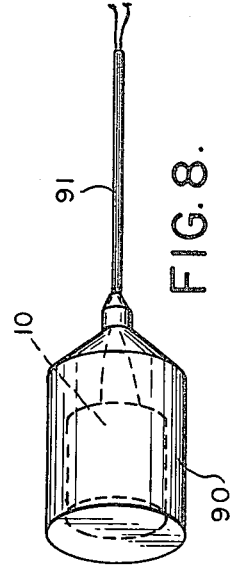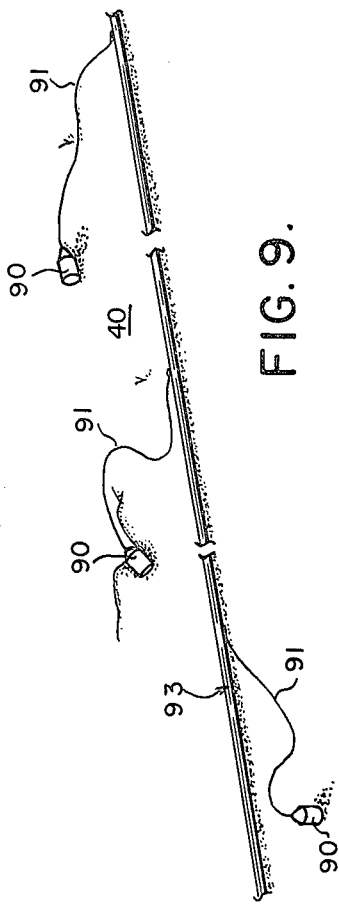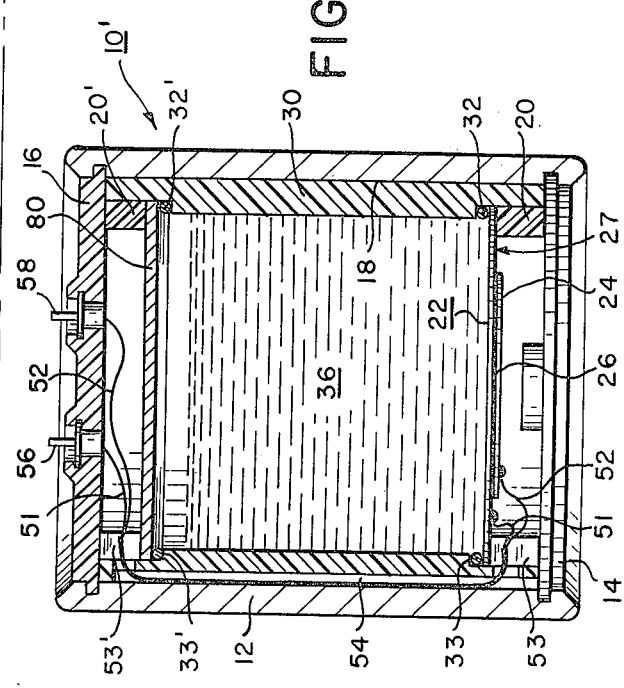

SEISMIC METHOD AND APPARATUS

This application is a continuation of copending application Ser. No. 887,165, filed Mar. 16, 1978, now abandoned which is a continuation-in-part of application Ser. No. 783,531, filed Apr. 1, 1977, now abandoned.

BACKGROUND OF THE INVENTION (a) Field of the Invention

This invention relates to a method of geophysical exploration employing liquid-filled geophones, which do not require orienting and which are especially adapted for being towed by a flexible member over the earth's surface. The method is characterized in that the electric signals produced by the geophones have a polarity which is independent of the orientation of the axes of the geophones relative to the vertical over an arcuate span ranging from 0° to 180°.

(b) Reference to Related Prior Art

In reflection seismic prospecting, the reflected seismic signals are detected with seismic detectors, either geophones or hydrophones. Geophones are typically for land use and hydrophones for marine use. In use, a geophone is coupled to the earth and is responsive to movements thereof. A hydrophone is submerged in water and is responsive to the pressure changes produced therein by the movements of the earth. Either type may be used in shallow waters, typically positioned on the bottom of the body of water. For the sake of simplicity, the term geophone as used herein shall be understood to also include seismic detectors used on or in water. Most practical geophones presently commercially employed constitute an electromagnetic circuit which includes a coil and a magnet movable relative to each other. A conventional geophone is substantially responsive only to movements of the earth having a component force along its axis and, in use, produces an output electric signal having a polarity dependent upon the direction of such force.

During normal seismic prospecting, geophones are manually disposed upright on the earth's surface with their axes substantially in alignment with the vertical. When a geophone accidentally or otherwise becomes disposed on the earth's surface such that its axis is excessively inclined from vertical, or in the extreme case, when the geophone is completely on its side (90° from vertical), it becomes inoperative for all practical purposes. Also, when a geophone becomes accidentally disposed upside-down (180° from vertical), it will produce a signal having a polarity which is opposite from the polarity of the signal produced by the geophone when upright. In either case, the failure to produce an output signal, or the production of an opposite polarity signal, adversely affects the records produced by the seismic prospecting.

To overcome the problems when such upright positioning is impractical, the geophones are mounted on orienting means which are adapted to continuously maintain the geophones in an upright position. A very common orienting means is provided by a gimbal mount. More recently, attempts have been made to mount the geophones on a flat, flexible, conveyor-type belt which is towed by a vehicle. The belt is intended to maintain the geophones substantially upright. The dragging of such belts in many instances has not produced the anticipated results, and, therefore, seismic crews still continue to spread out the geophones manually in an upright position, all of which is time consuming and very expensive.

As the search for hydrocarbons is increasingly expanding to relatively inaccessible terrains, the need to uprightly dispose the geophones over the earth's surface, or to use self-orienting means, such as gimbal mounts, places a heavy burden on the seismic crews. This burden has plagued the seismic industry for many years in spite of continuous efforst to devise geophones which can be towed and which need not be uprightly implanted on the earth's surface, as above described.

After long experimentation I have devised a novel, liquid-filled geophone which can effectively replace conventional geophones, especially of the electro-magnetic type that have been almost exclusively used commercially to date.

Accelerometers using liquids as described in U.S. Pat. Nos. 3,270,565, 3,555,543 and in U.S.S.R. Inventor's Certificate 171,676 issued on July 26, 1965. Such liquid-filled devices, however, produce a response having the same polarity for all excitations, irrespective of direction, or are incapable of meeting the peculiar requirements imposed by seismic prospecting.

The novel geophone is relatively light weight, inexpensive to manufacture, capable of withstanding normal field abuse, and, above all, need not be implanted on the earth's surface in any particular orientation. The new and improved geophone therefore requires no self-orienting means which are expensive and frequently fail during normal field abuse. The polarity of the output signal produced by this novel geophone can be made to be independent of the inclination of the geophone's axis relative to the vertical. For upwardly and downwardly directed movements of the earth, this geophone will produce electric signals of opposite polarities, as required for seismic prospecting.

SUMMARY OF THE INVENTION

The method comprises in one preferred embodiment, towing a long, flexible member over the earth's surface, the member having liquid-filled geophones mounted thereon or coupled thereto and suitably spaced therealong, and a seismic cable for receiving the individual outputs of the geophones. Each liquid-filled geophone provides an output electric signal having characteristics corresponding to the direction of the earth's motion. The movement of the earth can be produced by a seismic energy source imparting energy into the earth so as to produce reflected seismic signals therein from underlying layers thereof. Using the preferred embodiment of the geophone, the polarity of the electric signals detected by the geophones and transmitted by the seismic cable to a utilization device is substantially independent of the orientations of the flexible member relative to the earth's surface and of the orientations of the axes of the geophones relative to the vertical. In another embodiment of the method of this invention, the geophones are positioned on the earth's surface in a predetermined pattern; their output signals are transmitted to the utilization device; and then the geophones are moved to another location and the process is repeated.

In a simplified apparatus embodiment, the geophone comprises a hollow cylindrical casing defining a chamber therein. A suitable liquid, preferably having a high density, substantially fills the chamber. The chamber has a flexible bottom wall which constitutes a force or pressure transducer. The transducer produces an electric signal having amplitude and polarity characteristics corresponding to the magnitude and direction of the flexure thereof. In a preferred embodiment of the geophone, the chamber has in addition to the flexible bottom transducer, a flexible top transducer. When the axis of the geophone is substantially vertical in an upright direction, the liquid in the chamber impinges upon the bottom transducer only, whereas for most inclination of the geophone the liquid impinges upon both bottom and top flexible transducers. When the geophone is upside-down, the liquid impinges on the top transducer only. The geophone provides at its output terminals electric signals corresponding to the output signals of the pair of transducers.

When a pair of transducers are used, they must be oppositely mounted. In this context, the phase "oppositely mounted" is intended to mean that the transducers of each pair are separated by at least a substantial portion of the liquid at least for certain orientations of the housing. A transducer pair may be oppositely mounted in separate casings with separate portions of liquid. This may conveniently be accomplished by use of two separate casings, each having a portion of the liquid associated with a single transducer.

In any event, it is preferable to have the planes of sensitivity of each transducer parallel to each other and, in a preferred embodiment, to have these planes perpendicular to a line drawn joining the transducers.

The transducers generate output signals in response to pressure exerted upon them by the interaction of the fluid mass and the transducers resulting from excitations of the earth's surface caused by reflected seismic signals. In particular, the geophone is primarily sensitive to accelerations of the earth's surface. Such accelerations are typically in the range of 10 to 1000 hertz and on the order of less than 3 percent of the acceleration due to gravity. The excitations of the earth's surface to which this device is sensitive may be considered to have both vertical and horizontal components. The sensitivity of any geophone to vertical and horizontal components may be controlled by the manner in which the output signals of the individual transducers in a pair are combined.

The geophones may be made sensitive primarily to vertical components by combining the individual transducer outputs by addition. The polarity of the sum will then indicate the direction of the vertical component without regard to the orientation of the geophone with respect to the vertical. That is, positive polarity may be used to indicate vertical components directed toward the center of the earth and negative polarity to indicate vertical components directed away from the center of the earth. If the dimensions of the chamber, and the proportion of the chamber filled with the liquid, are carefully chosen, the amplitude of the sum may be made constant for a given vertical component regardless of orientation of the housing. The components of the output signals from each transducer generated in response to horizontal components are of opposite polarity from each other and of equal magnitudes. They will therefore cancel each other when combined by addition.

On the other hand, the outputs of the transducers in each pair may be combined by subtraction. If the geophones are positioned approximately on their sides, the signal resulting from the subtraction is then proportional only to the horizontal components. All signals representing vertical components will be cancelled by the subtraction because, in this orientation, the output signals from each transducer generated in response to vertical components will be equal in magnitude and of the same polarity.

It is, therefore, particularly convenient to position the geophones approximately on their sides and record the output signals from each transducer in a pair separately. The signals may thereafter be combined, by addition and by subtraction, to determine both horizontal and vertical components without having to reorient the geophones.

Additional pairs of oppositely mounted flexible transducers may be added to increase the accuracy and amplitude of the resulting output signals.

The output signals from the transducers in each pair may be combined by addition and/or subtraction, in parallel or series, with the signals from transducers in other pairs or may be transmitted separately according to the needs of a particular situation.

BRIEF DESCRIPTION OF THE DRAWINGS

FIG. 1 is a sectional view in elevation of a preferred embodiment of the geophone of this invention;

FIG. 4 illustrates the installation of the geophone of the invention onto a towed seismic cable;

FIG. 5 illustrates a preferred method of seismic prospecting in accordance with the invention;

FIG. 6 is a view similar to FIG. 1 of a simplified embodiment of the geophone;

FIG. 7 is an illustration similar to FIG. 2 for the geophone embodiment shown in FIG. 6;

FIG. 8 is a perspective view of a housing for the geophone;

FIG. 9 illustrates the attachment of the geophone housings, shown in FIG. 8, onto a seismic spread cable, and the use of the spread cable for seismic prospecting illustrated in FIG. 5;

FIG. 10 is a sectional view illustrating a geophone having a rectangular cross-section; and FIG. 11 is a view similar to FIG. 10 with an elliptical cross-section.

DETAILED DESCRIPTION OF PREFERRED EMBODIMENTS

Figure 2:
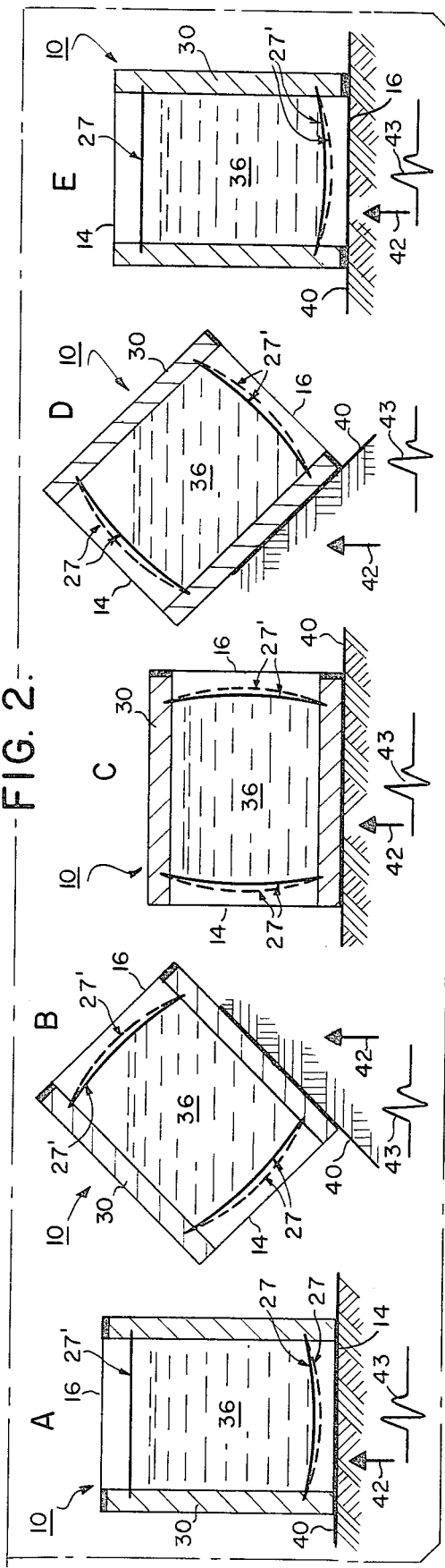
FIG. 2 illustrates the operation of the geophone for inclinations thereof from upright to upside-down for upwardly-directed movements of the earth.

The preferred embodiment of the liquid geophone, generally designated as 10, comprises a metal housing 12 having a cylindrical cross-section (FIG. 1). Housing 12 can also have a rectangular cross-section (FIG. 10), an elliptical cross-section (FIG. 11), or variations thereof depending on the desired sensitivity of geophone response.

In FIG. 1 housing 12 has bottom and top covers 14 and 16 which hermetically seal its inner cylindrical cavity 18. A split ring 20 rests on the bottom cover 14 and provides a support for a circular conductive wall 22 to the underface of which is secured a crystal 24 having a silver electrode 26. Throughout the description and to the extent possible, similar parts are designated with the same reference characters followed by a prime ('). A split angular ring 20' abuts against the top cover 16 and provides a support for a circular conductive wall 22' to the top face of which is secured a crystal 24' having a silver electrode 26'. Housing 12 is lined with a tubular plastic casing 30 (FIGS. 1, 10, 11) extending between bottom and top covers 14, 16. Walls 22, 22' abut against O-rings 32, 32', positioned on shoulders 33,33', respectively, formed in casing 30. The walls 22, 22' are secured to the shoulders 33, 33' by the annular ring 20, 20', respectively. Walls 22, 22' are flexible and their flexures are sensed by their crystals 24, 24', respectively. Thus, each flexible wall and the crystal mounted thereon constitutes a conventional force or pressure transducer. The transducers formed by walls 22, 22' and their respective crystals 24, 24'' are generally designated as 27, 27', respectively.

For the purposes of this description, transducers 27 and 27' are assumed to be mounted so that they will generate signals of the same polarity when a force or pressure causes them to bend outwardly away from liquid 36. Additional pairs of oppositely mounted flexible transducers (not shown) may be added to increase the accuracy and amplitude of the resulting output signals.

Housing 12 may also be made of a nonmetal, such as plastic, eliminating the need for tubular plastic casing 30. Walls 22 and 22' need not be made of conductive material except to the extent required to provide an electrical connection to crystals 24 and 24'.

The output signals from pressure transducer 27 are conducted through a pair of wires 51, 52, and the output signals from pressure transducers 27' are conducted through a pair of wires 51', 52'. Wires 51, 52 pass through a slit 53 in ring 20, a longitudinal groove 54 in the outer wall of casing 30, then through a slit 53' in ring 20'. The output signals carried by wires 51, 52 and 51', 52' can be added, either in series or in parallel, at a pair of the geophone's output terminals 56, 58, extending through top cover 16. On the other hand the wires 51, 52, 51' and 52' can be connected to four output terminals (not shown).

When the wires are connected to four output terminals, the outputs of each transducer of the pair may be recorded or otherwise utilized separately. Addition and/or subtraction may be then accomplished during recording or afterwards. As another alternative, the output signals carried by wires 51, 52 and 51', 52' can be subtracted from each other, either in series or in parallel, at output terminals 56 and 58.

The inner space confined between the transducers and the inner cylindrical wall of casing 30 forms a chamber 34 which is substantially fully, but not completely, filled by a liquid 36 serving as the inertial mass for the geophone 10. It is therefore desired that the liquid 36 have a high density, and a suitable such liquid is mercury. In the preferred embodiment, liquid 36 fills approximately 90% of the space in chamber 34, leaving approximately 10% of available space for expansion of the liquid due to temperature changes within the operating temperature range for the geophone.

The terms "substantially" and "substantially fully" which, when used, designated the degree to which the chamber is filled by the liquid, shall be understood to include all degrees of such filling beyond 50% full in which the upper transducer is at least partially decoupled from the liquid when the geophone is in an upright position. The term "liquid" as used herein is intended to include other fluids, such as powdered metals, which are suitable for use as inertial masses in geophones of the type described herein.

The action of the inertial liquid 36 on the pressure transducers 27, 27' will now be illustrated with reference to FIGS. 2 and 3, wherein only the operational parts of the geophone are shown, that is, casing 30 and its associated bottom and top transducers 27, 27'. The solid lines illustrate the positions of the flexible walls 22, 22' when the transducers are at rest, and the dotted lines illustrate their deflected positions produced by the pressures of the inertial liquid reacting to the earth motion.

In FIG. 2 geophone 10 is shown positioned over the earth's surface 40 at various inclinations from an upright position A to an inverted upside-down position E. The earth is assumed to undergo upward movements, represented by the arrows 42, which are transmitted to the inertial liquid 36 which, in turn, produces a force or pressure outwardly directed with respect to the axis of casing 30. Thus, in position A transducer 27 will bend outwardly toward cover 14, and transducer 27' will bend neither outwardly nor inwardly, since it is decoupled from the inertial liquid 36. In position B, at an inclination of 45° from vertical, transducer 27 will bend outwardly toward cover 14, and transducer 27' will bend outwardly toward cover 16. The same applies for position C corresponding to an inclination of 90° wherein the geophone lies completely on its side, and for position D corresponding to an inclination of 135°. In the fully-inverted, upside-down position E corresponding to an inclination of 180°, transducer 27' bent outwardly toward cover 16, and transducer 27 will bend neither inwardly nor outwardly, since in this position it is decoupled from liquid 36.

Thus, for all positions from 0° to 180° relative to the upright position A, either one or both of the pressure transducers 27, 27' will sustain an outwardly-directed deflection. The transducers 27, 27' will therefore produce electric signals 43 of the same polarity for all the outwardly-directed flexures.

As the level or degree of filling of chamber 34 with liquid 36 is increased, another effect becomes noticable. At sufficiently high degrees of filling the top transducer in the vertical position may no longer be completely decoupled even though liquid 36 does not actually impinge upon this transducer. That is, transducer 27' in position A and transducer 27 in position E may each exhibit a tendency to move inwardly in response to upward motions of the earth as represented by arrows 42. In such situations this top transducer will generate an output signal of the opposite polarity from the other transducer of the pair. The amplitude of this opposite polarity output will always be no greater than the amplitude of the output of the lower transducer. Geophone output signal 43, which is the sum of the output signals of transducers 27 and 27', will therefore always have the same polarity for all vertical components in the same direction without regard to the orientation of the geophone with respect to the vertical.

The degree of filling of chamber 34 has a different effect on the amplitude of geophone output signal 43 in position A or E than it has on the amplitude of signal 43 in positions B, C, or D. The amount of variation in the amplitude of signals 43 for the same accelerations in various geophone orientations may therefore be controlled somewhat by changing the degree of filling of chamber 34. The amplitude of the output signal from a transducer in response to a particular amplitude of excitation is primarily controlled by the height of liquid above the transducers in that particular orientation.

The partial decoupling of one transducer in certain orientations may be utilized in order to configure a geophone in which the sensitivity, that is, the ratio of the amplitude of the output signal to the amplitude of the detected component, is not effected by the orientation of the geophone with respect to the vertical.

In the preferred embodiment, the ratio of the diameter to height of the enclosed column of liquid 36 is chosen such that the amplitude of signals 43 remains substantially constant for all positions A through E of the geophone, i.e., from its upright to upside-down positions.

Geophone 10 may therefore be used in geophysical exploration to etect seismic reflections without careful positioning. That is, a series of such geophones may be positioned in random orientations and yet generate output signals having the correct amplitudes and polarities to represent vertical components of acceleration of the earth's surface.

In fact, geophone 10 may be made responsive only to vertical components. That is, horizontal components cause transducers 27 and 27' in respond in a manner in which the effects of such horizontal components are cancelled by the addition of the outputs of the transducers to form signals 43.

For ease of illustration, the effects of a horizontal component will be described assuming acceleration from left to right. The effects of horizontal components in any direction may be understood therefrom. In position A, horizontal components have no effect on either transducer because the acceleration is parallel to the surface of the transducers. In position B, transducer 27' will deflect inward and transducer 27 will deflect outward. The same applies for positions C and D. In position E there will be no net effect as noted above. In position C the amount of deflection and therefore the amplitudes of the output signals of transducers 27 and 27' will be equal. In positions B and D the ratio of the diameter to height of the enclosed column (when viewed in Position A) may be chosen, and the degree of filling of chamber 34 with liquid 36 may be adjusted, so that the amplitudes of the output signals of transducers 27 and 27' are approximately equal. Since these signals are of opposite polarity, they wll cancel when the outputs of transducers 27 and 27' are added to produce signal 43.

In this manner it can be seen that geophone 10 may be made to be sensitive only to vertical and not to horizontal components. That is, the effective sensitive axis of geophone 10 automatically remains oriented to the vertical without regard to the actual orientation of the device.

As noted above, in position C, the amplitudes of the output signals resulting from horizontal components are equal in amplitude but opposite in polarity. When combined by subtraction these signals will not cancel but will reinforce each other. Signal 43 formed in this manner will therefore be proportional to the effects of horizontal components. Further, the output signals resulting from vertical components produced by transducers 27 and 27' in position C are equal in amplitude and of the same polarity. Combination by subtraction will therefore result in cancellation. When the output signals of transducers 27 and 27' in position C are combined by subtraction, the resultant geophone output signal 43 contains the effects of horizontal components but not vertical components. As geophone 10 is changed in orientation from position C to positions B or D the amplitude of geophone output signal 43 formed by subtraction is reduced as a function of the cosine of the angle of orientation with respect to the horizontal. When position A or E is reached, output signal 43 is not representative at all of the horizontal components.

It is therefore particularly convenient to utilize a plurality of geophones 10 in substantially horizontal positions to detect reflected seismic signals. The outputs of individual transducers 27 and 27' of each pair may then be separately transmitted to the utilization device for combination by addition and subtraction in the utilization device or for recording and later combination so that both vertical and horizontal components may be determined for the same location on the surface of the earth by one of geophones without repositioning.

Figure 3:
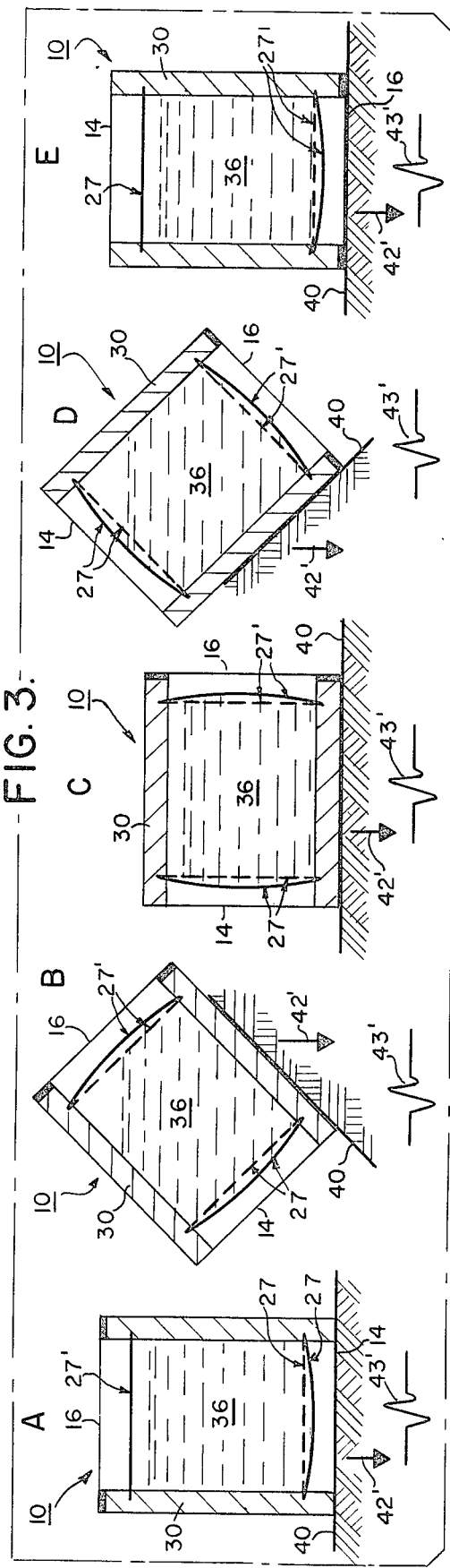
FIG. 3 is similar to FIG. 2 but for downwardly directed earth movements.

The description of FIG. 3 is similar to that of FIG. 2, except that the earth's movements, represented by the arrows 42', are now assumed to be directed downwardly, causing inwardly-directed flexures resulting from relief of static pressure of the inertial liquid and the spring action of the flexible walls 22, 22'.

As illustrated in FIG. 3, for all positions of geophone 10 from its upright position A to its upside-down inverted position E, the transducers 27, 27' will flex inwardly, that is, away from their respective covers 14, 16. The transducers 27, 27' will therefore produce electric signals 43', having a polarity opposite to the polarity of the electric signals 43 produced by transducers 27, 27' in response to the upwardly-directed movements of the earth, as shown in FIG. 2.

The design of geophone 10 makes it relatively easy to maintain the desired ratio, between the mass of the inertial liquid 36 and the mass of the remaining components of the geophone including housing 12, greater than one. Such a ratio is favorable for seismic prospecting, as described in U.S. Pat. No. 3,067,404. In the prior art utilizing self-aligning means, such as gimbal mounts, for orienting the geophone, the heavy mass of such means makes it virtually impossible to achieve said desired ratio.

In FIG. 6 is shown a less desirable embodiment of the geophone, generally designated as 10'. In geophone 10', only a single bottom transducer 27 is employed, and a rigid wall 80 is substituted for the pressure transducer 27'. In all other important respects, geophones 10, 10' are identical.

In FIG. 7 are illustrated various inclinations A through E of geophone 10', similar to the inclinations A through E of geophone 10 in FIG. 2. It will be noted that when geophone 10' is in the upright position A, its output signal $S_1$ is identical in amplitude and polarity to the output signal 43 of geophone 10 when in its upright position, in response to upwardly-directed earth movements 42a. As geophone 10' assumes progressive inclinations toward the upside-down position E, the amplitude of the geophone's output signal decreases, as illustrated by the decreasing amplitudes of signals $S_2$, $S_3$, $S_4$, produced by the geophone in its positions B, C, D, respectively. The output signal $S_5$ is substantially zero when geophone 10' is upside-down. It will be noted, however, that the polarity of signals $S_1$–$S_4$ is the same as the polarity of signals 43 in FIG. 2. These comparisons with output signal 43 of geophone 10 ignore the effects of the opposite polarity output of the top transducer as discussed above.

The geophone 10 or 10' can be housed in a suitable housing 60 (FIG. 4) which is protected by a resilient sleeve whose ends are suitably secured by a tape 65 to the outer sleeve of a towable seismic cable 62. A pair of wires 66, 67 interconnect the output terminals of the geophone with a pair of conductors in seismic cable 62.

If sensitivity to both vertical and horizontal components is desired, one additional pair of wires, not shown, will be required to connect the geophone with one additional pair of conductors, not shown, in seismic cable 62.

Thus cable 62 may have associated therewith and interconnected therein a plurality of suitably spaced-apart geophones. In accordance with a very important aspect of this invention, each geophone can lie on its side, as shown in FIG. 4, yet still be fully operative and responsive, as shown in FIGS. 2C, 3C, 7C, to upwardly and downwardly directed earth's movements represented by the arrows 42 and 42', respectively.

In accordance with one embodiment of the method of the invention, the seismic cable 62 together with its geophones is towed with a seismic truck 72 having a utilization device such as a recorder 73 therein which receives and records the signals from cable 62. Cable 62 can be wound on and unwound from a rotatably-mounted spool 70, and the seismic energy needed for seismic exploration can be imparted into the earth by a suitable seismic energy source 74.

In an alternate embodiment of the method of the invention, each geophone 10 is housed in a housing 90 (FIG. 8) and the output terminals of the geophone are connected to a lead-in, short cable 91 which extends from a spread cable 93. The seismic crew positions cable 93 on the earth's surface 40, with the housings 90 disposed in any desired detection pattern, but housings 90 need not be oriented in any particular direction with respect to the vertical. However, if housings 90 contain geophones 10', then the housings should not be disposed on the earth's surface 40 in an upside-down position to prevent the decoupling of the inertial liquid 36 from the wall 22 of the only transducer 27, as shown in FIG. 7E.

Instead of employing crystal pressure sensors, 24, 24', typically made of a piezoceramic material, other pressure sensors can equally be employed, as will be apparent to those skilled in the art.

What I claim is:

1. A seismic detector comprising:
   a housing including an internal chamber;
   a fluid mass in the chamber; and
   means for generating a pair of transducer signals in response to excitation of the fluid mass by seismic signals so that the vertical components of the seismic signals may be identified and processed separate from the horizontal components regardless of the orientation of the housing to the gravitational vertical.

2. The seismic detector of claim 1, wherein the transducer signal generating means further comprises:
   means for combining the transducer signals by addition so that the polarity of the sum thereof represents the direction of vertical components of the seismic signals regardless of the orientation of the housing with respect thereto.

3. The seismic detector as defined in claim 1, wherein the transducer signal generating means further comprises:
   means for combining the transducer signals by addition so that the magnitude of the sum represents the magnitude of the vertical components, regardless of the orientation of the housing with respect thereto.

4. The seismic detector of claim 2 or 3, wherein the portions of the transducer signals representing horizontal components are effectively cancelled by the combination by addition regardless of the orientation of the housing with respect to the vertical.

5. The seismic detector of claim 4, wherein the amplitude of the sum of the transducer signals is substantially the same for vertical components of equal magnitude regardless of the orientation of the housing with respect thereto.

6. The seismic detector of claim 4, wherein the dimensions of the portion of the chamber filled by the fluid mass are selected so that the amplitude of the sum of the transducer output signals is substantially the same for vertical components of equal magnitude regardless of the orientation of the housing with respect thereto.

7. The seismic detector of claim 4, wherein the degree of filling of the chamber by the fluid mass is selected so that the amplitude of the sum of the transducer signals is substantially the same for vertical components of equal magnitude for any orientation of the housing.

8. The seismic detector of claim 1 wherein the transducer signal generating means, further comprises:
   a pair of oppositely mounted transducers in the chamber, wherein the amplitude of the result of subtraction is substantially the same for horizontal components of equal magnitude when the housing is oriented so that a line drawn between the transducers is generally horizontal.

9. The seismic detector of claim 8, wherein the transducer signal generating means further comprises:
   means for combining the transducer signals by subtraction so that the result thereof represents the horizontal components of seismic signals regardless of the orientation of the housing with respect thereto.

10. The seismic detector of claim 8 wherein the amplitude of the result of subtraction for horizontal components of equal magnitude is a function of the cosine of the angle between the line and the horizontal.

11. The seismic detector of claim 8 wherein the fluid mass is substantially contained between the transducers.

12. The seismic detector of claim 8 wherein the planes of sensitivity of each of the two transducers are parallel.

13. The seismic detector of claim 12 wherein the planes are perpendicular to a line drawn between the transducers.

14. The seismic detector of claim 8 wherein each transducer comprises:
    a flexible wall forming one portion of the internal chamber; and
    means to detect deflection of the flexible wall.

15. The seismic detector of claim 14 wherein the deflection detection means is a piezo-electric crystal.

16. A method of seismic signal detection, comprising the steps of:
    positioning a plurality of seismic detectors substantially but not completely filled with fluid masses, in random orientations, on the earth's surface;
    measuring the pressures exerted by the masses as a result of excitations of the earth's surface, caused by reflected seismic signals, with a pair of oppositely mounted pressure transducers in each detector; and
    combining the output signals produced by each transducer in a pair to determine components of the excitations.

17. The method of claim 16 wherein the combining step includes the step of:

combining the output signals by addition to determine only the vertical components.

18. The method of claim 17 including the steps of:
adjusting the degree of filling of the detector so that the sensitivity of the detector to vertical components is the same in all orientations.

19. The method of claim 16 wherein the detectors are positioned in horizontal orientations and combining step includes the step of:
combining the output signals by subtraction to determine only the horizontal components of the excitations.

20. The method of claim 16 wherein the combining step includes the steps of:
combining the output signals by addition and by subtraction to separately determine the vertical and the horizontal components of the excitations.

21. A seismic detector, comprising:
a housing including an internal chamber;
a fluid mass in the chamber;
means for generating a pair of transducer output signals in response to the effects of seismic signals on the fluid mass; and
means for generating a first detector output signal by combining the transducer output signals to cancel the portions of each transducer signal generated in response to horizontal components of the seismic signals so that the magnitude of the first detector output signal is proportional only to the vertical components.

22. The seismic detector of claim 21 wherein the proportionality factor remains substantially constant regardless of the orientation of the housing with respect to the vertical.

23. The seismic detector of claim 21 wherein the sign of the first detector output signal indicates the direction of the vertical component.

24. The seismic detector of claim 21, further comprising:
means for generating a second detector output signal by combining each transducer output signal to cancel the portions thereof generated in response to vertical components of seismic signals so that the magnitude of the second detector output signal is proportional only to the horizontal components.

25. The seismic detector of claim 24 wherein the proportionality factor is a function of the cosine of the angle between the housing and the horizontal.

26. A seismic detector, comprising:
a housing including an internal chamber;
a fluid mass in the chamber;
means for generating a pair of transducer signals in response to the effects of seismic signals on the fluid mass; and
means for generating a detector output signals by combining the transducer signals to cancel the portions thereof generated in response to vertical components of seismic signals so that the magnitude of the detector output signal is proportional only to the horizontal components.

27. A seismic detector, comprising:
a housing including a chamber;
a fluid mass in the chamber;
a pair of parallel transducers oppositely mounted in the chamber and substantially containing the fluid mass therebetween and responsive to the effects of seismic signals thereon;
means for combining output signals of the transducers to generate a detector output signal; and
means for positioning the detector so that a line drawn between the transducers is generally horizontal so that the detector output signal is proportional only to the horizontal components of the seismic signals.

28. A seismic detector having orthogonal structural axes, comprising:
a chamber containing a pair of oppositely-positioned pressure transducers having a volume of fluid therebetween;
means for establishing effective axes of sensitivity relative to the gravitational vertical, independently of the orientation of said structural axes, by sensing transducer output signals resulting from the pressure of said fluid against said pressure transducers due to an accelerating force.

29. The seismic detector as defined by claim 28, comprising:
means for separately measuring the magnitudes of vertical and horizontal components of said accelerating force by selectivly combining the output signals of said transducers.

* * * * *